United States Patent Office

3,839,525
Patented Oct. 1, 1974

3,839,525
METHOD OF PRODUCING A NET-LIKE THERMOPLASTIC MATERIAL
Martin E. Doll, Patterson, N.C., assignor to Cellu Products Company, Patterson, N.C.
Continuation-in-part of application Ser. No. 837,162, June 27, 1969, now Patent No. 3,642,967. This application Sept. 9, 1971, Ser. No. 179,012
Int. Cl. B29d 23/10
U.S. Cl. 264—154                                7 Claims

ABSTRACT OF THE DISCLOSURE

Net-like thermoplastic materials of superior tensile strength are produced by methods wherein a film of thermoplastic material is slit in a predetermined pattern, the slit film is opened into net-like form, and a generally rounded cross-section is imparted to portions of the net-like material by heating of the film to a temperature at which surface tension of the thermoplastic material acts to minimize the surface area to volume ratio. Process parameters and the thermoplastic material used are selected to provide desired product characteristics, as disclosed in the specification.

---

Figure 1:
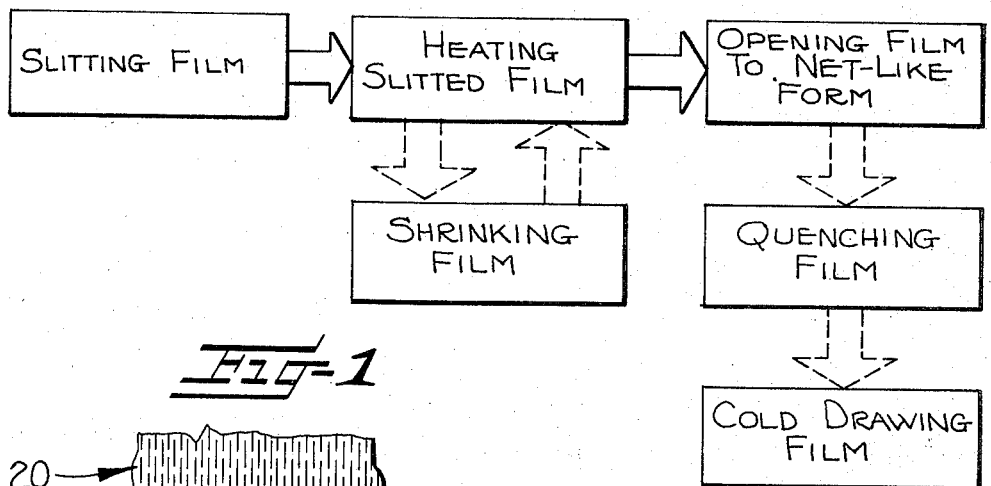

This application is a continuation-in-part of copending application Ser. No. 837,162, filed June 27, 1969 and entitled "Methods of Producing Net-like Thermoplastic Materials and Products" and now Pat. No. 3,642,967.

Textile netting conventionally has been used for packaging of various products moving in commerce, such as onions, potatoes and other vegetables or produce, where air flow through or ventilation of the package is desired. With the development of technology relating to thermoplastic materials, it has been proposed to substitute thermoplastic packaging materials for the textile netting products heretofore conventionally employed. Such attempts toward developing thermoplastic materials have, however, encountered shortcomings and deficiencies.

One of such attempts employs a sheet of thermoplastic film having round or oval holes therethrough. However, if the holes are sufficient in number, size and spacing to provide the desired ventilation, the tensile strength of the material is greatly reduced and renders the material unsuitable for many packaging applications. If sufficient tensile strength is maintained, then the desired ventilation cannot be achieved.

Heretofore, slitting of film materials in an effort to produce a net-like product having the ventilation properties of textile netting has also been proposed, but has resulted in materials having relatively low tear strength at the slits or incisions formed therein. Due to this low tear strength, the material pulls apart or tears relatively easily, and is unsatisfactory for the conditions of use encountered in a packaging environment.

It is an object of the present invention to produce net-like thermoplastic materials having enhanced tear strength and which thereby avoid the shortcomings and deficiencies heretofore encountered. In accordance with the present invention, such improved net-like thermoplastic material is produced by a method which includes formation of portions of the net-like material into generally rounded cross-sectional configurations, thereby strengthening those portions of the material which otherwise would tear when subjected to stress. In particular, realization of this object of the invention is achieved by heating a slitted film to a temperature at which the surface tension of the thermoplastic material draws portions thereof into a generally rounded cross-section.

Yet another object of the present invention is to provide a packaging material having enhanced tear strength through having portions thereof of a preferred cross-sectional configuration. Further, the packaging material produced in accordance with the present invention may have openings therein of a desired reduced size through shrinking of the film subsequent to slitting thereof and may have enhanced filament strength due to cold drawing thereof.

Some of the objects and advantages of the invention having been stated, others will appear as the description proceeds, when taken in connection with the accompanying drawings, in which—

Figure 2:
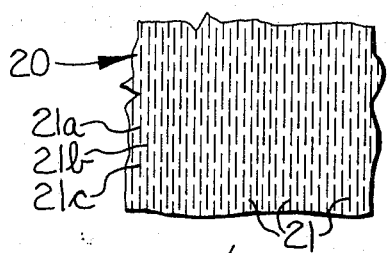
Figure 3:
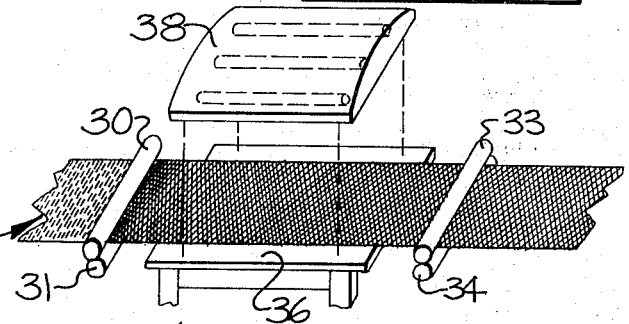
Figure 4:
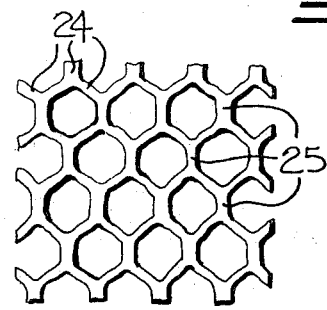
Figure 5:
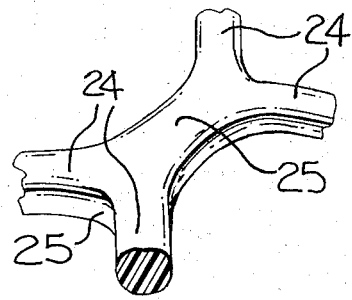
Figure 6:
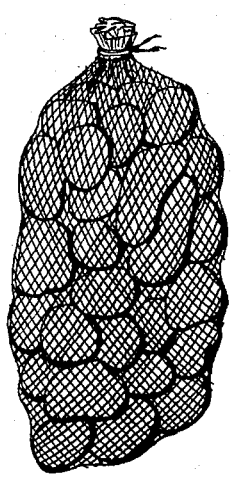

FIG. 1 is a flow diagram of steps to be followed in practicing the methods of the present invention;
FIG. 2 is a plan view of a portion of slitted film in accordance with this invention;
FIG. 3 is a schematic perspective view of an apparatus appropriate for performing certain method steps with the slitted film of FIG. 2;
FIG. 4 is an enlarged view similar to FIG. 2, showing a film opened into net-like form in accordance with this invention;
FIG. 5 is an enlarged perspective view of a portion of the film of FIG. 4; and
FIG. 6 is a perspective view of an application of the product of this invention.

In the disclosure which follows, the method and product of the present invention will be described with particular reference to the generalized flow diagram of FIG. 1 and the more specific illustrative embodiments disclosed in FIGS. 2–4. At the outset, it is to be understood that the choice of materials and steps illustrated in FIGS. 2–5 is to be construed broadly, rather than as a limitation upon the generalized series of steps represented in FIG. 1.

As set forth in the flow diagram of FIG. 1, the present method of producing net-like thermoplastic material broadly comprises the steps of slitting a film 20 (FIG. 2) of thermoplastic material in a predetermined pattern of spaced aparts rows 21 of spaced incisions 21a, 21b, 21c with the incisions in adjacent rows being in predetermined staggered relation to define therebetween strand portions 24 initially of generally rectangular cross-section and junction nodes 25 where the strand portions 24 join together. The slit film 20 of thermoplastic material is subsequently opened into net-like form (FIG. 4) by exertion thereon of a force having at least a component directed transversely to the rows of incisions in the film (such as is represented by the vector F in FIG. 2). The opened film of thermoplastic material is "heat set" with the incisions thereof in lozenge-like form.

The present invention uses to advantage a characteristic of thermoplastic materials which is referred to herein as "elastic memory." Elastic memory is that property of thermoplastic materials which results in the material seeking to maintain a particular form or shape until the material is either torn apart or deformed while at an elevated temperature. Typically, the elastic memory of a thermoplastic material may be overcome by heating the material to a predetermined temperature characteristic of the particular material, deforming the material while at an elevated temperature, and then cooling the material below the temperature to set the material in the newly imparted shape. A material so formed is herein referred to as being "heat set."

As disclosed hereinabove, slitting of the film 20 of thermoplastic material forms therein strand portions 24 defined between the rows of spaced incisions. While the film of thermoplastic material is relatively thin, the thickness dimension thereof is sufficient as compared with the width of the strand portions 24 to characterize the strand portions as being of generally rectangular cross-section. In cross-section and as formed by incisions in the film, the strand portions 24 have side planes which intersect at four generally right angular corners. Further, the junction nodes 25 where strand portions 24 come together, as defined by the adjacent ends of two aligned incisions, are very sharply pointed intersections. As will be understood, such a sharply pointed intersection introduces a concentration of stress which lessens the tear strength of the net-like thermoplastic material, as does the cross-sectional configuration of the strand portions.

In accordance with the present invention, the strand portions 24 of the film 20 are drawn into a generally rounded cross-section and the sharply pointed intersection of the strand portions at the junction nodes 25 is modified to a more rounded configuration (FIG. 5) by heating of the film to a temperature at which the surface tension of the thermoplastic material acts toward minimizing the surface area to volume ratio of the strand portions. In particular, it is a known physical characteristic that surface tension forces in a material having a liquid or plastic state tend to cause the material to assume a configuration wherein the ratio of surface area to volume occupied is minimized. This known physical characteristic is used in the method of the present invention to enhance the tear strength of the resultant product, in that the heating of the slit film is to a temperature sufficient to reduce the polymer viscosity to a point where surface tension forces draw the strand portions into generally rounded cross-section.

Typically, such heating of the film comprises raising the film to a temperature sufficiently high to not only destroy local order in any crystalline forming polymer being used but also to reach or exceed the initial softening point or melting point of the thermoplastic material. The upper limit of the heating step is determined by the temperature at which the film will totally lose the film form and deform in a very liquid-like manner. In raising the film to a temperature above the melting point thereof, the temperature of the film must not be raised to this entire liquification temperature. As is known to persons familiar with processes involving film-forming thermoplastic polymer material, melting or softening of such materials occurs over a range of temperatures and deformation of the materials is time-temperature dependent in that deformation proceeds more quickly at more elevated temperatures. Thus, temperatures used in the processes of this invention are subject to variation and the best or preferred temperature must be empirically determined for any particularly specified thermoplastic material and processing apparatus.

In accordance with the present invention, it is contemplated that heating of the film to an elevated temperature and opening of an incremental length of film proceed at the same time and further that the opening does not involve deformation of the strand portions beyond their elastic limit. Further it is anticipated that processing of certain films will be enhanced by supporting of the film during heating and opening thereof. With particular reference to the apparatus illustrated in FIG. 3, slit film 20 is expanded by being passed through the nips of successive pairs of rolls 30, 31 and 33, 34. The second pair of rolls 33, 34 are driven with a linear surface speed higher than the first pair of rolls 30, 31 in order to exert on film passing therebetween a force having at least a component directed transversely to the rows of incisions therein. Spaced between the pairs of rolls is a supporting surface 36, over which the film passes and which supports the film during heating and opening thereof to control sagging of the film which otherwise may occur. The film is heated during opening by an appropriate heat source 38 overlying the path of travel of the film between the pairs of rolls. The heat source 38 may be in any suitable form, such as a radiant energy emitting coil or lamp, a direct fired heater, or other known means.

It is recognized that the characteristics of the resulting product may be controlled by the choice of thermoplastic material used as the film and other pre- and post-processing procedures. In particular, films are formed by both crystalline and non-crystalline film forming polymers. The present invention is equally applicable to both crystalline and non-crystalline materials which may include, by way of example only and not by way of limitation, films of high or low density polyethylene, polypropylene, polyamides, polyester, polyvinyl chloride, urethanes and other known thermoplastic materials. Crystalline materials are preferred for applications in which the net-like films are subjected to tension loads and the like, while non-crystalline materials are satisfactory for nonload bearing applications. With certain of these materials, additional processing procedures may be employed to control the dimensions of the opened areas of the resulting net-like product and the filament strength of the materials.

More particularly, it is known that thermoplastic films, as received for input into the method of the present invention, have properties which are affected by any film history of quenching, drawing, and annealing. Advantage is taken of such film histories by formation of the slit pattern in a film having an inherent shrinkability. Thereafter, shrinking of the slitted film is performed to reduce the overall width and length of the strand portions thereof, by heating the film to a first temperature. Such shrinking results in formation of a net-like material having openings therein of substantially smaller dimension than might otherwise be the case. Typically, such shrinkage of a thermoplastic film occurs at a lower temperature than that softening temperature at which the surface tension of the thermoplastic material draws the strand portions into a generally rounded cross-section, such that shrinking and heating of the film may be performed by separate, successive heating steps or performed on a running length of film by shrinking the film during initial stages of heating of the film to the softening temperature.

Particularly with crystalline film forming polymers, it is contemplated that the filament strength of the strand portions of the resulting net-like product may be enhanced by certain post heating and opening processing steps. In particular, the crystalline structure of the film is developed to a controlled extent by subsequent quenching and/or annealing. As known, quenching may be carried out slowly by natural convection with ambient air or more rapidly by forced convection of air and other forced cooling. Annealing of the film may be accomplished by heating thereof to a temperature range below the upper melting limit for varying times. Further, a film having a controlled crystalline structure may be cold drawn at a ratio up to five to increase the filament strength of the strand portions. As herein used, the term "cold drawing" relates to drawing at any temperature below the range of melting temperatures of the thermoplastic material.

One specific example of a preferred embodiment for the present invention occurs in the use of film formed of polyethylene having a density in the range defined between the limits of 0.92 grams per cubic centimeter and 0.97 grams per cubic centimeter. Particularly with a polyethylene film having thickness between 3 and 10 mils, the film is heated to a temperature in excess of 260° F. and preferably in the range of 350° F. to 400° F. for a time in the range of ten seconds to one minute. Such heating is sufficient to reduce the melt viscosity of the film to a point permitting surface tension induced flow within portions of the film. Any subsequent cold drawing of such a film may proceed at temperatures around 212° F., such as during immersion of the film in a bath of boiling water. In such a preferred embodiment it is important, as briefly pointed out above, that the film product introduced into the method of this invention be characterized fully as to constituents and history in order that process performance be as desired.

Polyethylene netting thus produced is useful in packages, such as shown in FIG. 6, wherein products such as potatoes, onions or other produce are contained in bags comprising films in net-like form.

In the drawings and specification, there has been set forth a preferred embodiment of the invention, and although specific terms are employed, they are used in a generic and descriptive sense only and not for purposes of limitation.

That which is claimed is:

1. A method of producing net-like thermoplastic materials comprising the steps of
   slitting a film of thermoplastic material in a predetermined pattern of spaced apart rows of spaced incisions with the incisions in adjacent rows being in predetermined stagged relation to define therebetween strand portions of generally rectangular cross-section,
   opening the film into net-like form by exerting thereon a force having at least a component directed transversely to the rows of incisions therein, and
   heating the film to a temperature sufficient to reach the initial melting point of the film but without entirely liquifying the same and so that the surface tension of the thermoplastic material draws the strand portions into a generally rounded cross-section and while maintaining the film in the net-like form.

2. A method according to Claim 1 wherein the film is a noncrystalline film forming polymer.

3. A method according to Claim 1 wherein the film is a crystalline film forming polymer.

4. A method according to Claim 1 wherein the opening of the film proceeds with deformation of the strand portions being kept within the elastic limit thereof.

5. A method according to Claim 4 further comprising supporting the film during the heating and opening thereof.

6. A method according to Claim 1 wherein the film is crystalline polyethylene polymer and further wherein the heating of the film raises the film to a temperature of at least about 260° F. and maintains the film at that temperature for an interval of at least about 10 seconds.

7. A method according to Claim 6 wherein the polyethylene film has a density within a range defined by limits of 0.992 and 0.97 grams per cubic centimeter and a thickness within a range of about 3 to about 10 mils.

References Cited

UNITED STATES PATENTS

| | | | |
|---|---|---|---|
| 3,505,157 | 4/1970 | Fields et al. | 264—167 |
| 3,336,696 | 8/1967 | Jackson | 161—117 |
| 3,387,077 | 6/1968 | Sammons et al. | 264—289 |
| 3,488,415 | 1/1970 | Patchell et al. | 264—289 |
| 3,273,329 | 9/1966 | Scragg | 264—016.047 |
| 3,137,746 | 6/1964 | Seymour et al. | 264—289 |

GEORGE F. LESMES, Primary Examiner

J. J. BELL, Assistant Examiner

U.S. Cl. X.R.

161—112, 117, 109; 206—1; 264—DIG. 047

UNITED STATES PATENT OFFICE
CERTIFICATE OF CORRECTION

Patent No. 3,839,525            Dated October 1, 1974

Inventor(s) Martin E. Doll

It is certified that error appears in the above-identified patent and that said Letters Patent are hereby corrected as shown below:

Column 5, Line 16, "stagged" should be --staggered--;
Column 6, Line 13, "0.992" should be --0.92--.

Signed and sealed this 3rd day of December 1974.

(SEAL)
Attest:

McCOY M. GIBSON JR.
Attesting Officer

C. MARSHALL DANN
Commissioner of Patents